(12) United States Patent
Fujimoto

(10) Patent No.: US 8,320,104 B2
(45) Date of Patent: Nov. 27, 2012

(54) ELECTROLYTIC CAPACITOR

(75) Inventor: Kazumasa Fujimoto, Saga (JP)

(73) Assignees: SANYO Electric Co., Ltd., Moriguchi-shi, Osaka (JP); Saga Sanyo Industries Co., Ltd., Kishima-gun, Saga (JP)

( * ) Notice: Subject to any disclaimer, the term of this patent is extended or adjusted under 35 U.S.C. 154(b) by 372 days.

(21) Appl. No.: 12/645,602

(22) Filed: Dec. 23, 2009

(65) Prior Publication Data

US 2010/0165545 A1    Jul. 1, 2010

(30) Foreign Application Priority Data

Dec. 26, 2008   (JP) .................................. 2008-332286

(51) Int. Cl.
*H01G 4/32* (2006.01)
*H01G 9/04* (2006.01)
(52) U.S. Cl. ........................................ 361/511; 361/530
(58) Field of Classification Search .......... 361/511–512, 361/530
See application file for complete search history.

(56) References Cited

U.S. PATENT DOCUMENTS

| | | | | |
|---|---|---|---|---|
| 3,988,650 | A * | 10/1976 | Fritze ............................ | 361/511 |
| 5,843,599 | A * | 12/1998 | Paz-Pujalt et al. ............. | 430/17 |
| 6,366,445 | B1 * | 4/2002 | Bruvelaitis et al. ........... | 361/511 |
| 6,433,997 | B1 * | 8/2002 | Noguchi et al. ............... | 361/511 |
| 6,831,826 | B2 * | 12/2004 | Iwaida et al. .................. | 361/502 |
| 7,663,864 | B2 * | 2/2010 | Fujimoto et al. ............... | 361/511 |
| 7,881,043 | B2 * | 2/2011 | Hirose et al. .................. | 361/502 |
| 8,054,610 | B2 * | 11/2011 | Kee ................................ | 361/516 |
| 2003/0223178 | A1 * | 12/2003 | O'Phelan et al. ............. | 361/512 |
| 2007/0115611 | A1 | 5/2007 | Fujimoto et al. | |
| 2010/0073850 | A1 * | 3/2010 | Fujimoto ....................... | 361/530 |
| 2010/0091433 | A1 * | 4/2010 | Fujimoto et al. ............... | 361/527 |
| 2011/0157778 | A1 * | 6/2011 | Fujimoto ....................... | 361/531 |

FOREIGN PATENT DOCUMENTS

| | | | |
|---|---|---|---|
| JP | 03286514 A | * | 12/1991 |
| JP | 03292712 A | * | 12/1991 |
| JP | 03297120 A | * | 12/1991 |
| JP | 2007-173773 A | | 7/2007 |

* cited by examiner

*Primary Examiner* — Eric Thomas
(74) *Attorney, Agent, or Firm* — Westerman, Hattori, Daniels & Adrian, LLP

(57) ABSTRACT

A first anode foil is opposed to a first portion of a cathode foil and is arranged on one side of the cathode foil, and a second anode foil is opposed to a second portion of the cathode foil and is arranged on the other side. A first separator paper sheet is arranged between the first portion of the cathode foil and the first anode foil. A second separator paper sheet is arranged on the other side with respect to the cathode foil, and is opposed to the first portion of the cathode foil. A third separator paper sheet is arranged between the second portion of the cathode foil and the second anode foil. A fourth separator paper sheet is arranged on the one side with respect to the cathode foil, and is opposed to the second portion of the cathode foil.

10 Claims, 7 Drawing Sheets

US 8,320,104 B2

ELECTROLYTIC CAPACITOR

BACKGROUND OF THE INVENTION

1. Field of the Invention

The present invention relates to an electrolytic capacitor, and particularly to an electrolytic capacitor having anode and cathode members and the like that are wound together.

2. Description of the Background Art

At present, attention has been given to electrolytic capacitors that use electrically conductive polymer materials such as polypyrrole, polythiophene, polyfuran or polyaniline, or TCNQ complex salt (7,7,8,8-tetracyano-quinodimethane). In this kind of electrolytic capacitor, a capacitor element is formed of anode and cathode foils that are wound together with a separator interposed therebetween, and is housed in a casing of aluminum. Aluminum foil provided with a dielectric oxide film is used as the anode foil, and aluminum foil is used as the cathode foil.

The anode and cathode foils and the like of the conventional electrolytic capacitor employing the above aluminum foils are wound as follows. As shown in FIG. 6, anode and cathode foils 140 and 141 as well as two belt-like separator paper sheets 106 and 107 each having a predetermined length are prepared. These are arranged such that one separator paper sheet 106 is interposed between anode and cathode foils 140 and 141, and anode foil 140 is interposed between one and other separator paper sheets 106 and 107. Anode and cathode leads 151 and 152 that will form anode and cathode terminals in the completed electrolytic capacitor are connected to anode and cathode foils 140 and 141 through lead tab terminals 150.

Then, as shown in FIG. 7, ends on one side of anode and cathode foils 140 and 141 as well as separator paper sheets 106 and 107 thus arranged are pinched between cores 131a and 131b, and cores 131a and 131b pinching them are turned in a predetermined direction so that anode and cathode foils 140 and 141 and others are wound up from the one end to form a capacitor element 102 as shown in FIG. 8.

In the solid electrolytic capacitor using the electrically conductive polymer material such as polypyrrole, polythiophene or the like, it is required to reduce an ESR (Equivalent Series Resistance), and demands for the electrolytic capacitors of the low ESR are rapidly increasing. However, further reduction in ESR will soon be limited in the electrolytic capacitor (wound-type electrolytic capacitor) formed by winding up the anode and cathode foils and others.

As a wound-type electrolytic capacitor meeting such demands of a market, the inventors and others have proposed an electrolytic capacitor employing a plurality of anode foils. The electrolytic capacitor having the plurality of anode foils has a plurality of anode leads and thus has multiple terminals. For example, when the electrolytic capacitor has the two anode leads, it also has two cathode leads so that the four leads in total are connected to the capacitor element.

Particularly, as compared with the two-terminal structure, the multi-terminal structure is further restricted in position of the lead tab terminal attached to the anode foil or the like, in connection with the leading or guiding position of the lead tab terminal and the manner of winding. This will be described below.

In the electrolytic capacitor of the two terminals, the position where the lead tab terminal is located in the capacitor element after the winding processing depends on the position where the lead tab terminal is connected to the anode foil. Therefore, it is difficult to change the position of connection of the lead tab terminal. For example, as shown in FIG. 9, when a anode foil 161 is to be wound from it one end A and anode foil 161 has a length C (e.g., about 120 mm), a position 163 where the lead tab terminal is attached is at a distance B of about 30 mm from one end A.

Then, it is assumed that the multi-terminal electrolytic capacitor employs two anode foils. FIG. 10 shows an ideal arrangement for suppressing the ESR to the maximum extent in this case. In this arrangement, two anode foils 161a and 161b have the same size (C/2), and positions 163a and 163b where the lead tab terminals are attached are located near longitudinally central positions of anode foils 161a and 161b, respectively.

As shown in FIG. 11, when the winding of anode foil 161a starts from its one end A, position 163a where the first lead tab terminal is connected must be at a distance of about 30 mm from one end A, in view of the pitch of the lead tab terminals and the positional relationship between them after the winding. Also, position 163b where the second lead tab terminal is connected must be at a distance of about 6 mm from position 163a where the first lead tab terminal is connected. Therefore, when two anode foils 161a and 161b have the same size, the two lead tab terminals are connected to one anode foil 161a, and no lead tab terminal is connected to other anode foil 161b.

For overcoming the above, the first lead tab terminals may be connected to the one anode foil, and the second lead tab terminal may be connected to the other anode foil. In this case, as shown in FIG. 12, two anode foils 161a and 161b must have different lengths D and E, respectively, and one and other anode foils 161a and 161b must have length D from about 35 mm to about 45 mm, and length E from about 85 mm to about 80 mm, respectively. As described above, when the multi-terminal structure employs the manner of starting the winding from one end of the anode foil, the foregoing ideal arrangement cannot be employed due to restrictions on the positional relationship between the first and second lead tab terminals.

For overcoming the above problem, the inventors and others have proposed, in Japanese Patent Laying-Open No. 2007-173773, a manner of winding foils and others (anode foils 103 and 104, a cathode foil 105 and separator paper sheets 106 and 107) that have predetermined lengths and are located in predetermined positions, respectively, by starting the winding from their longitudinally central portions. Also, the inventors and others have proposed a manner shown in FIG. 14, in which the winding starting from the longitudinally central portions is performed using cores 131a and 131b with cathode foil 105 located between two separator paper sheets 106 and 107.

In this case, first and second anode leads 111 and 112 are connected to first and second anode foils 103 and 104 through lead tab terminals 150, respectively. Also, first and second cathode leads 113 and 114 are connected to cathode foil 105 through lead tab terminals 150, respectively.

SUMMARY OF THE INVENTION

The present invention provides a further improvement as a part of a series of developments of the foregoing electrolytic capacitor, and an object of the invention is provide an electrolytic capacitor that can suppress a deviation in winding of anode and cathode foils and/or separator paper sheets.

An electrolytic capacitor according to the invention is formed by winding a cathode foil, first and second anode foils and first, second, third and fourth separator paper sheets each having a belt-like form, and includes the cathode foil, the first and second anode foils and the first, second, third and fourth separator paper sheets. The cathode foil is wound in a state where a first portion extending from a longitudinally central portion to a first end on one end side is opposed to a second portion extending from the longitudinally central portion to a second end on the other end side, by starting the winding in a predetermined direction from a position corresponding to the longitudinally central portion. The first anode foil is arranged inside the first portion located at the inner side of the wound cathode foil, and is opposed to the first portion. The second anode foil is arranged between the first portion located at the inner side of the wound cathode foil and the second portion located at the outer side of the wound cathode foil, and is opposed to the second portion and the first portion. The first separator is interposed between the first portion of the cathode foil and the first anode foil. The second separator is interposed between the first portion of the cathode foil and the second anode foil. The third separator is interposed between the second anode foil and the second portion of the cathode foil. The fourth separator is arranged outside the second portion of the cathode foil and is opposed to the second portion.

Another electrolytic capacitor according to the invention is formed by winding a cathode foil, first and second anode foils and first, second, third and fourth separator paper sheets each having a belt-like form, and includes a capacitor element wound as described below. The capacitor element is formed by arranging the first anode foil on a first side with respect to the cathode foil such that the first anode foil is opposed to a first portion of the cathode foil extending from a longitudinally central portion to a first end on one end side, arranging the second anode foil on a second side opposite to the first side with respect to the cathode foil such that the second anode foil is opposed to a second portion of the cathode foil extending from the longitudinally central portion to a second end on the other end side, interposing the first separator between the first portion of the cathode foil and the first anode foil, arranging the second separator on the second side with respect to the cathode foil such that the second separator is opposed to the first portion of the cathode foil, interposing the third separator between the second portion of the cathode foil and the second anode foil, arranging the fourth separator on the one side with respect to the cathode foil such that the fourth separator is opposed to the second portion of the cathode foil, winding, in a predetermined direction, the cathode foil, the first and second anode foils, and the first, second, third and fourth separator with the first and second portions of the cathode foil opposed to each other, and starting the winding from a position corresponding to the longitudinally central portion.

In the electrolytic capacitor according to the invention, the two separators, i.e., the first and fourth separators are located on the first anode foil side with respect to the cathode foil, and are arranged in the longitudinal direction of the cathode foil. The two separators, i.e., the second and third separators are located on the second anode foil side with respect to the cathode foil. Thereby, in an operation of winding the first and second anode foils, cathode foil and four separators, a winding core can be kept in direct contact with the cathode foil. Consequently, it is possible to suppress a deviation in winding of the first and second anode foils, cathode foil and separators.

In the electrolytic capacitor according another aspect of the invention, the two separators, i.e., the first and fourth separators are located on a first side with respect to the cathode foil, and the two separators, i.e., the second and third separators are located on a second side with respect to the cathode foil. Thereby, the separators are divided, in the longitudinal direction of the cathode foil, into two groups. Therefore, in an operation of winding the first and second anode foils, cathode foil and four separators, a winding core can be kept in direct contact with the cathode foil. Consequently, it is possible to suppress a deviation in winding of the first and second anode foils, cathode foil and separators.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An electrolytic capacitor according to an embodiment of the invention will be described below. A capacitor element of the electrolytic capacitor is formed by winding two anode foils, one cathode foil and four separator paper sheets each having a belt-like form. The anode foil is, e.g., an aluminum foil subjected to etching processing and chemical processing. The cathode foil opposed to the anode foils is, e.g., an aluminum foil.

Figure 1:
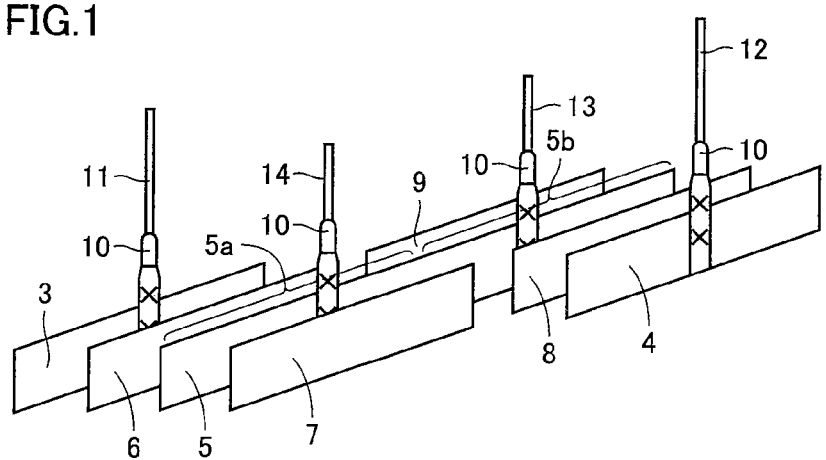
FIG. 1 is an exploded perspective view of a capacitor element in an electrolytic capacitor according to an embodiment of the invention.

FIG. 1 is an exploded perspective view of the capacitor element. As shown in FIG. 1, a cathode foil 5 extending in the belt-like form has a first portion 5a that extends from its longitudinally central portion to its first end on one end side. A first anode foil 3 is arranged on one side with respect to cathode foil 5 and is opposed to first portion 5a. A second anode foil 4 is arranged on the other side (i.e., the side opposite to the one side) with respect to cathode foil 5, and is opposed to a second portion 5b of cathode foil 5 that extends from the longitudinally central portion to a second end on the other end side.

A first separator paper sheet 6 is interposed between first portion 5a of cathode foil 5 and first anode foil 3. A second separator paper sheet 7 is arranged on the other side with respect to cathode foil 5, and is opposed to first portion 5a of cathode foil 5. A third separator paper sheet 8 is interposed between second portion 5b of cathode foil 5 and second anode foil 4. A fourth separator paper sheet 9 is arranged on one side with respect to cathode foil 5, and is opposed to second portion 5b of cathode foil 5.

First and second anode leads 11 and 12 are connected to first and second anode foils 3 and 4 through lead tab terminals 10, respectively. First and second cathode foils 13 and 14 are connected to cathode foil 5 through lead tab terminals 10, respectively.

In the capacitor element, as described above, first and fourth separator paper sheets 6 and 9 are arranged on the one side with respect to cathode foil 5, and second and third separator paper sheets 7 and 8 are arranged on the other side with respect to cathode foil 5. Thus, the separator paper sheets opposed to cathode foil 5 are divided into two groups aligned in the longitudinal direction of cathode foil 5.

Figure 2:
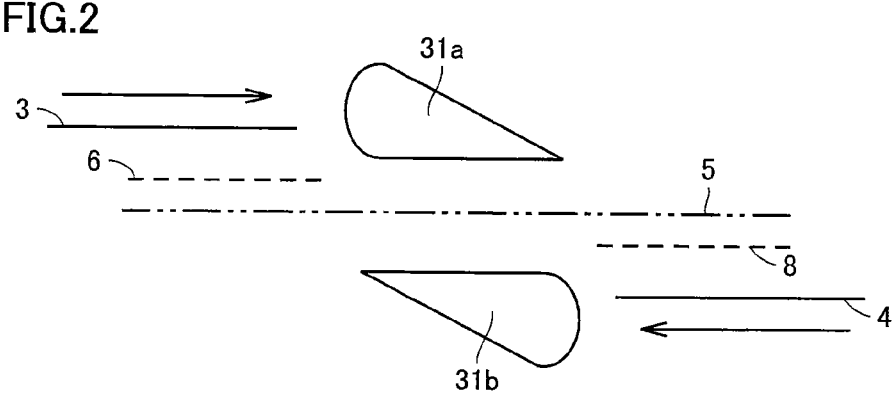
FIG. 2 is a plan showing a step in a manufacturing method of the electrolytic capacitor in the embodiment.
Figure 3:
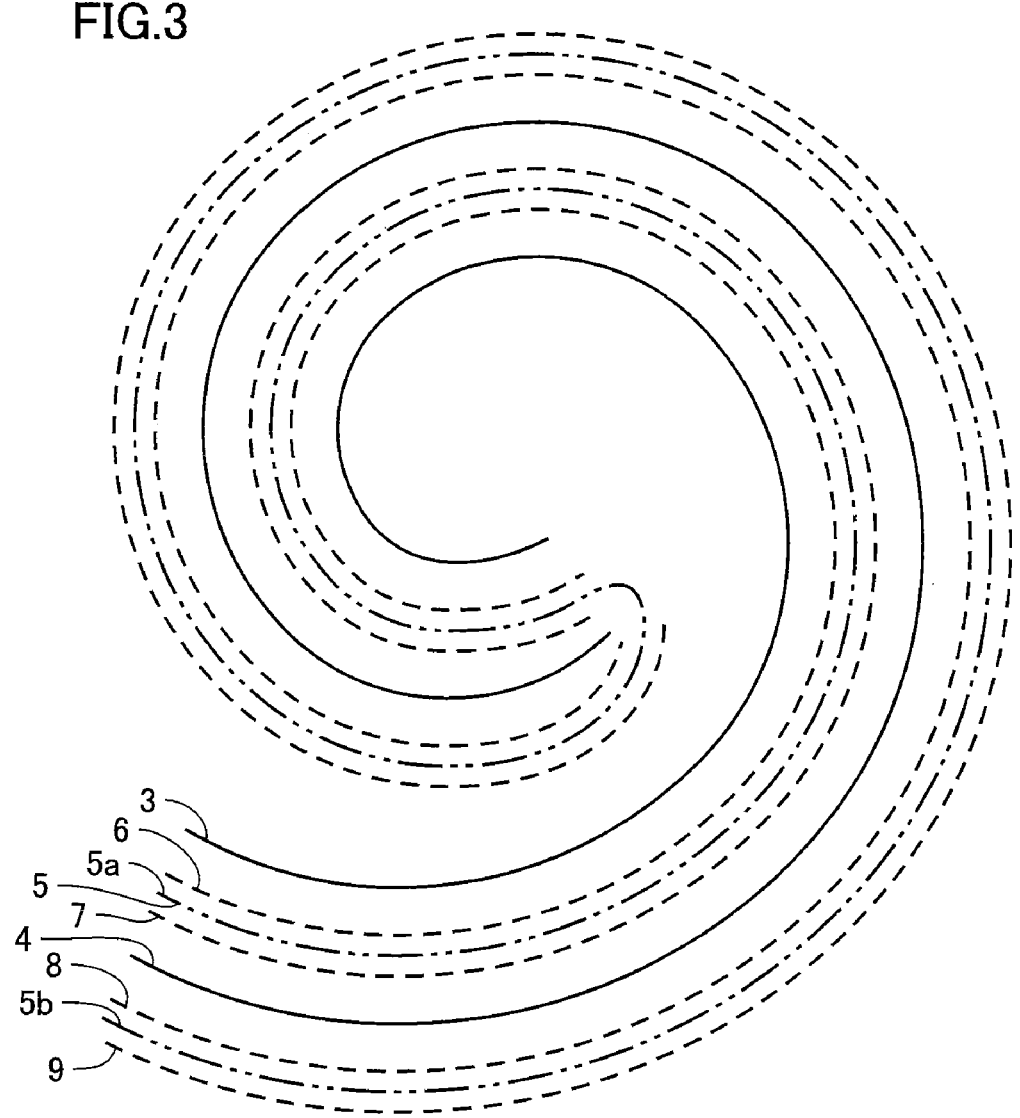
FIG. 3 is a schematic plan showing the capacitor element having a wound form and subjected to the step shown in FIG. 2.
Figure 4:
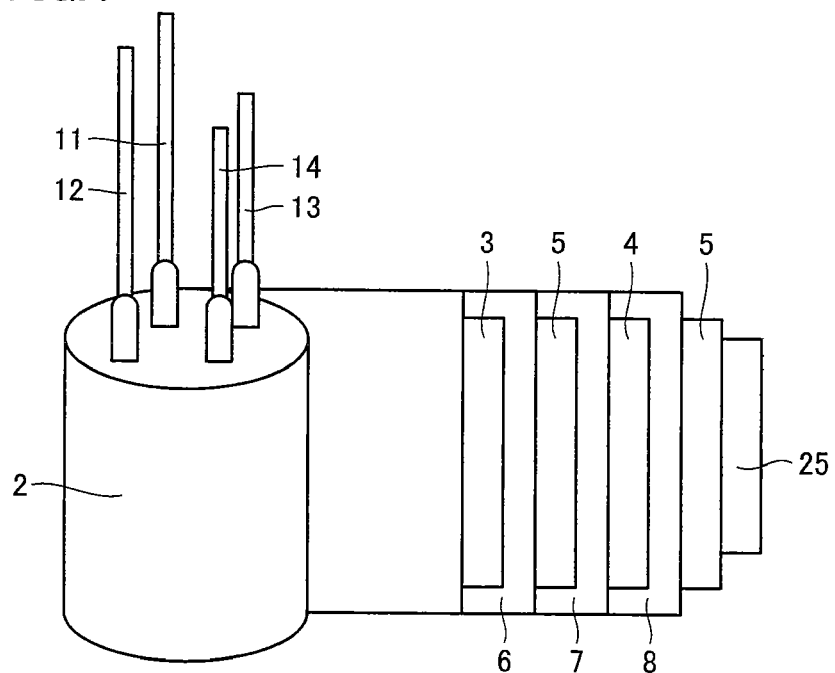
FIG. 4 is a perspective view showing a step executed after the step shown in FIG. 2 in the embodiment.

Then, a manufacturing method of the electrolytic capacitor will be described. As shown in FIG. 2, cathode foil 5 is directly pinched at a position corresponding to its longitudinally central portion, and is turned in a predetermined direction. While cathode foil 5 is being turned, third separator paper sheet 8, second anode foil 4, first separator paper sheet 6 and first anode foil 3 located in the state shown in FIG. 1 are pinched, and second and fourth separator paper sheets 7 and 9 (both not shown in FIG. 2) are further pinched so that first and second anode foils 3 and 4, cathode foil 5 and first to fourth separator paper sheets 6 to 9 that will form a capacitor element 2 are wound as shown in FIGS. 3 and 4.

In this manner, the winding of cathode foil 5 in the predetermined direction starts in the position corresponding to the longitudinally central position in such a state that first portion 5a extending from the longitudinally central portion to the first end on the one end side is opposed to second portion 5b extending from the longitudinally central portion to the second end on the other end side. Consequently, first anode foil 3 is opposed to first portion 5a that is a radially inner portion of wound cathode foil 5, and is located radially inside first portion 5a. Second anode foil 4 is opposed to second and first portions 5b and 5a located at outer and inner sides of wound cathode foil 5, respectively, and is arranged between first and second portions 5a and 5b.

First separator paper sheet 6 is interposed between first portion 5a of cathode foil 5 and first anode foil 3. Second separator paper sheet 7 is interposed between first portion 5a of cathode foil 5 and second anode foil 4. Third separator paper sheet 8 is interposed between second anode foil 4 and second portion 5b of cathode foil 5. Fourth separator paper sheet 9 is opposed to second portion 5b of cathode foil 5, and is arranged radially outside second portion 5b.

Then, capacitor element 2 undergoes forming processing on cut surfaces and others of the anode foils and others, and further undergoes thermal processing at a temperature from 150° C. to 300° C. Then, capacitor element 2 is impregnated with a solution mixture of e.g., 3,4-ethylene dioxythiophene that is a monomer to be polymerized for forming an electrically conductive polymer and, e.g., a p-toluenesulfonate ferric ion alcoholic solution used as an oxidant solution. Thereafter, thermochemical polymerization is performed to form an electrically conductive polymer layer (not shown) between the opposite electrodes of capacitor element 2. Another electrolyte may be employed. For example, an electrically conductive polymer material such as polypyrrole, polyfuran or polyaniline, or a TCNQ complex salt (7,7,8,8-tetracyanoquinodimethane).

Figure 5:
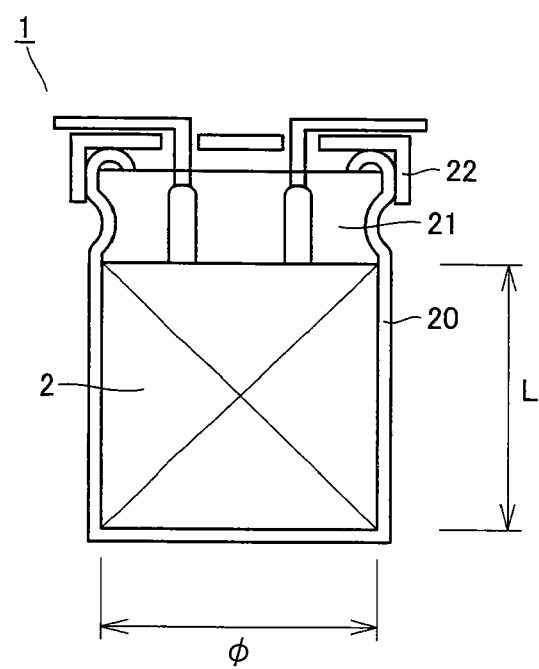
FIG. 5 is a cross section showing a step executed after the step shown in FIG. 4 in the embodiment.

Then, as shown in FIG. 5, a rubber packing 21 for sealing is attached to capacitor element 2, and capacitor element 2 is housed in an aluminum casing 20 of a predetermined size. Then, an opening of aluminum casing 20 is sealingly closed by lateral drawing and curling, and aging processing is performed. Thereafter, a seat plate 22 made of plastic is attached to a curled surface of aluminum casing 20, and pressing and bending are effected using the anode and cathode leads as the electrode terminals so that an electrolytic capacitor 1 is completed.

Practical Example

Figure 13:
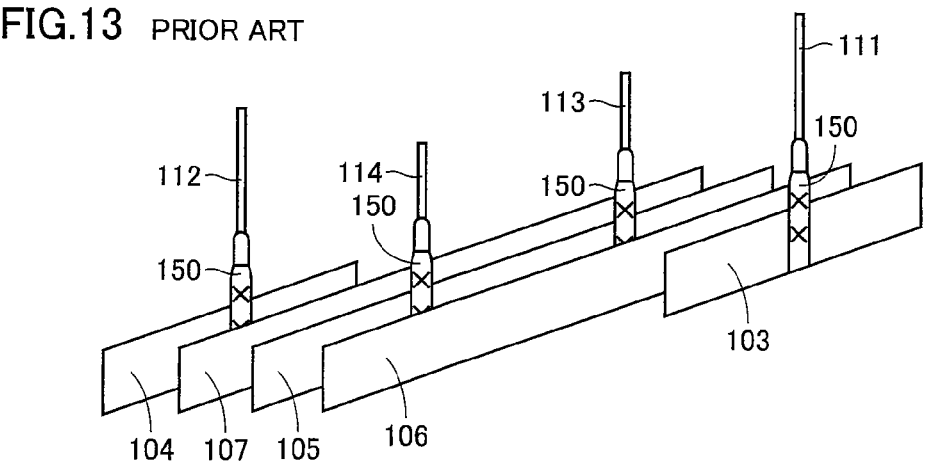
FIG. 13 is an exploded perspective view of a capacitor element in another conventional electrolytic capacitor.
Figure 14:
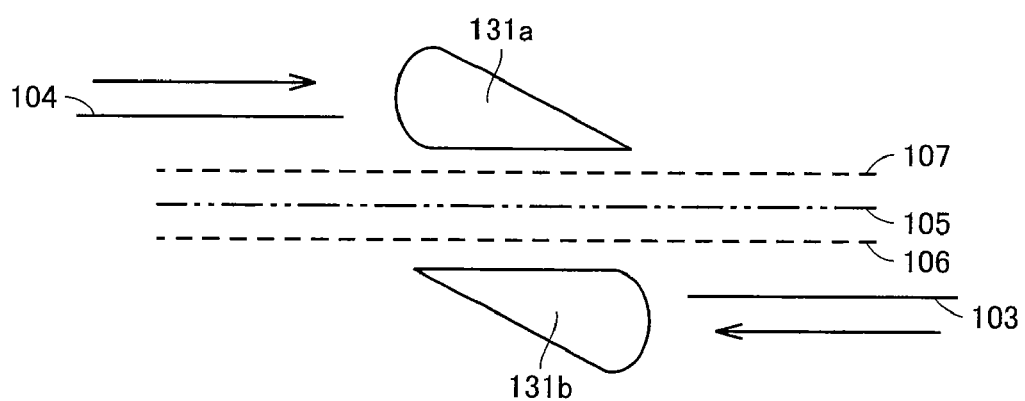
FIG. 14 is a plan showing a step in a conventional manufacturing method of another electrolytic capacitor.

Evaluation of deviation in winding was performed on the foregoing electrolytic capacitor. An electrolytic capacitor of a 4V-part (8 mm in diameter and 12.0 mm in length: see FIG. 5) was used as a target of the evaluation. An electrolytic capacitor having an arrangement structure shown in FIG. 13 was used as an example for comparison. One thousand specimens were prepared for each type. Presence and absence of the winding deviation were evaluated by X-rays. A result of the evaluation is shown in a table 1.

TABLE 1

|  | Number of Processed Parts | Number of Winding Deviations |
|---|---|---|
| Practical Example (FIG. 1) | 1000 p | 0 p |
| Example for Comparison (FIG. 13) | 1000 p | 9 p |

As shown in Table 1, the electrolytic capacitor according to the embodiment exhibits a result that 1000 processed parts (i.e., 1000 specimens) caused no winding deviation. However, the electrolytic capacitor according to the example for comparison exhibits that the 1000 processed parts caused the winding deviations in nine electrolytic capacitors.

When the winding deviation causes a relative deviation between the separator paper sheet and the anode foil, or between the separator paper sheet and the cathode foil, and thereby causes a partial contact between the anode and cathode foils, an electrical shorting may occur to increase a leakage current (LC characteristics), and a breakdown voltage may lower.

When the winding deviation occurs, a form of the capacitor element may deform. This may cause a mechanical stress in the capacitor element when the electrolytic capacitor is assembled, and therefore may deteriorate the LC characteristics and breakdown characteristics.

Description will now be given on evaluation of the electric characteristics that were performed on the foregoing electrolytic capacitor. An electrolytic capacitor of a 4V-part (8 mm in diameter and 12.0 mm in length: see FIG. 5) was used as a target of the evaluation. An electrolytic capacitor having an arrangement structure shown in FIG. 2 was used as an example 2 for comparison. Thirty specimens were prepared for each type. A result of the evaluation is shown in a table 2.

TABLE 2

Figure 6:
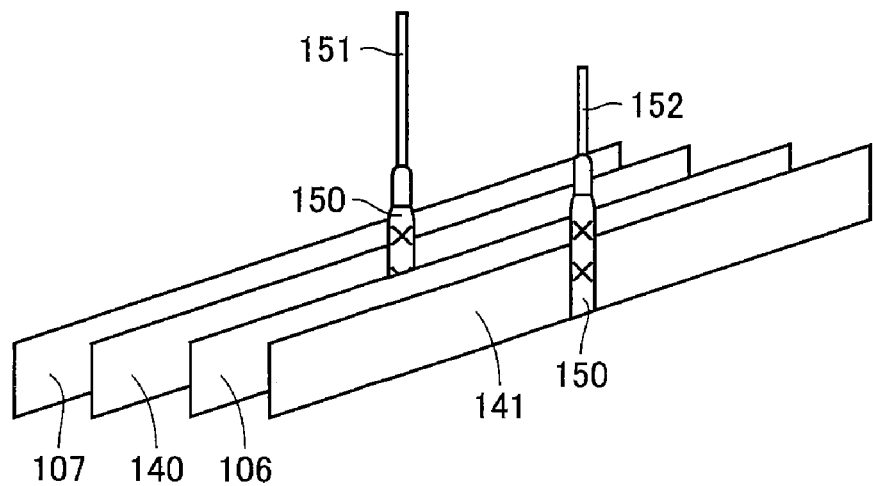
FIG. 6 is an exploded perspective view of a capacitor element in a conventional electrolytic capacitor.
Figure 7:
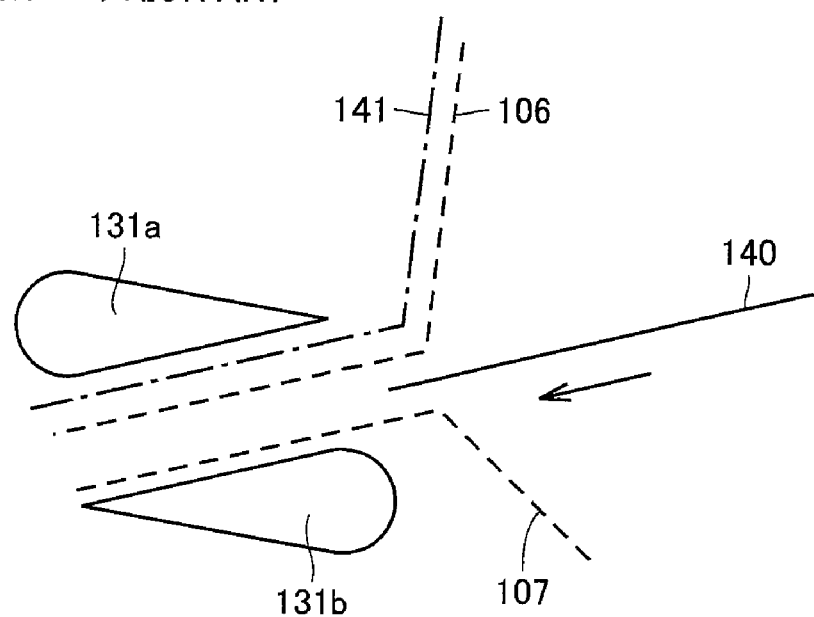
FIG. 7 is a plan showing a step in a conventional manufacturing method of an electrolytic capacitor.
Figure 8:
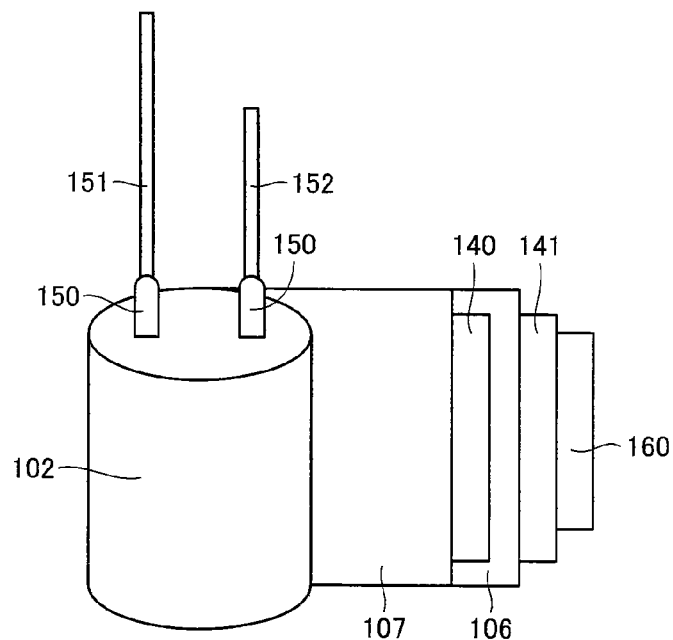
FIG. 8 is a perspective view showing a step performed after the step shown in FIG. 7.
Figure 9:
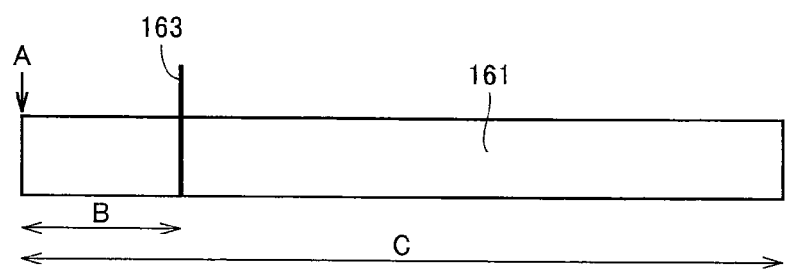
FIGS. 9 to 12 are first to fourth plans showing a relationship between anode foils and connection positions of tab terminals, respectively.
Figure 10:
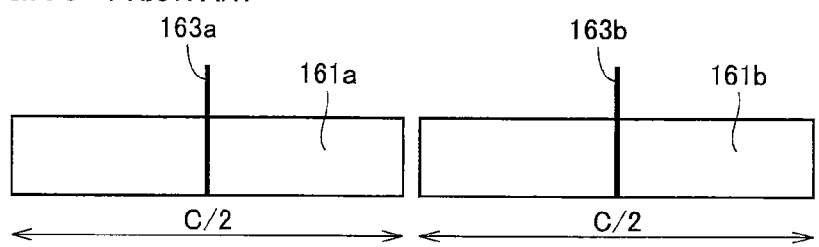
Figure 11:
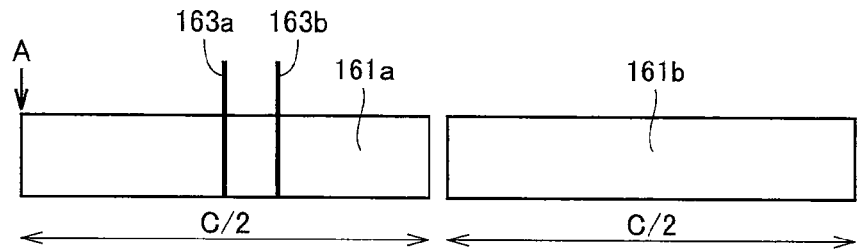
Figure 12:
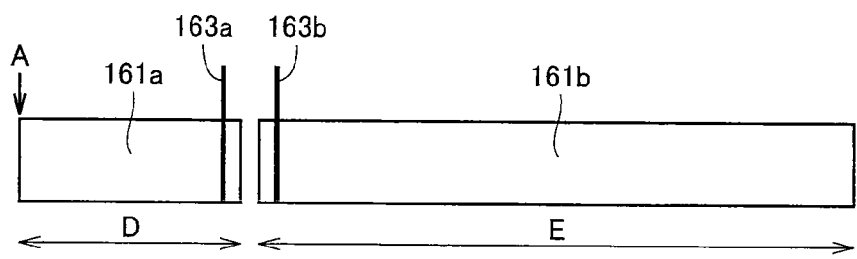

|  | Number of Terminals | Winding Manner | Cap. (μF) | tanδ (%) | ESR (mΩ) | LC (μA) |
|---|---|---|---|---|---|---|
| Practical Example | 4 | FIG. 1 | 1522 | 1.3 | 2.4 | 3 |
| Example 1 for Comparison | 4 | FIG. 13 | 1520 | 1.3 | 2.4 | 11 |
| Example 2 for Comparison | 2 | FIG. 6 | 1570 | 1.3 | 6.1 | 12 |

In the Table 2, Cap. represents an electrostatic capacity, and tan δ represents a dielectric loss tangent. ESR represents an equivalent series resistance, and LC represents a leakage current. Cap. and tan δ were measured with a frequency of 120 Hz, and ESR was measured with a frequency of 100 kHz. LC was a value exhibited after 2 minutes from application of a rated voltage.

As can be seen from the Table 2, the electrolytic capacitor according to the embodiment exhibited the improved LC as compared with the examples 1 and 2 for comparison, and also exhibited the improved ESR as compared with the example 2 for comparison. It is verified from these results that the electrolytic capacitor of the embodiment can suppress the occurrence of the winding deviation.

According to the electrolytic capacitor of the embodiment, as described above, separator paper sheets 6, 7, 8 and 9 are divided into the two groups in the longitudinal direction so that the operation of winding first and second anode foils 3 and 4, cathode foil 5 and separator paper sheets 6 to 7 can be performed while keeping winding cores 31*a* and 31*b* in contact with cathode foil 5. Thereby, the winding deviation does not occur in first and second anode foils 3 and 4, cathode foil 5 and separator paper sheets 6 to 7 so that the ESR, LC and the like can be significantly improved.

In the electrolytic capacitor that has been described by way of example, first and second anode foils 3 and 4 are connected to first and second anode leads 11 and 12, respectively, cathode foil 5 is connected to first and second cathode leads 13 and 14, and the leads are four in total number. However, the number of each kind of leads is not restricted to the above.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electrolytic capacitor formed by winding a cathode foil, first and second anode foils and first, second, third and fourth separators each having a belt-like form, and comprising:
    the cathode foil being wound in a state where a first portion extending from a longitudinally central portion to a first end on one end side is opposed to a second portion extending from said longitudinally central portion to a second end on the other end side, by starting the winding in a predetermined direction from a position corresponding to said longitudinally central portion,
    the first anode foil being arranged inside said first portion located at an inner side of said wound cathode foil and being opposed to said first portion,
    the second anode foil being arranged between said first portion located at said inner side of said wound cathode foil and said second portion located at an outer side of said wound cathode foil, and being opposed to said second portion and said first portion,
    the first separator being interposed between said first portion of said cathode foil and said first anode foil,
    the second separator being interposed between said first portion of said cathode foil and said second anode foil,
    said third separator being interposed between said second anode foil and said second portion of said cathode foil, and
    said fourth separator being arranged outside said second portion of said cathode foil and being opposed to said second portion.

2. The electrolytic capacitor according to claim 1, further comprising:
    a first anode lead connected to a predetermined position of said first anode foil,
    a second anode lead connected to a predetermined position of said second anode foil,
    a first cathode lead connected to said first portion of said cathode foil, and
    a second cathode lead connected to said second portion of said cathode foil.

3. The electrolytic capacitor according to claim 1, wherein said electrolytic capacitor includes, as an electrolyte, an electrically conductive polymer material containing at least one of polypyrrole, polythiophene and polyaniline, or a TCNQ complex salt (7,7,8,8-tetracyano-quinodimethane).

4. An electrolytic capacitor according to claim 1, wherein the cathode foil is wound by starting the winding in the predetermined direction from the position corresponding to the longitudinally central portion, with a winding core being kept in direct contact with the cathode foil.

5. An electrolytic capacitor according to claim 1, wherein an end of the first separator and an end of the fourth separator, each located in the position corresponding to the longitudinally central portion of the cathode foil, are at a distance from each other, and
    an end of the second separator and an end of the third separator, each located in the position corresponding to the longitudinally central portion of the cathode foil, are at a distance from each other.

6. An electrolytic capacitor formed by winding a cathode foil, first and second anode foils and first, second, third and fourth separators each having a belt-like form, and comprising:
    a capacitor element formed by:
    arranging the first anode foil on a first side with respect to said cathode foil such that said first anode foil is opposed to a first portion of said cathode foil extending from a longitudinally central portion to a first end on one end side,
    arranging the second anode foil on a second side opposite to said first side with respect to said cathode foil such that said second anode foil is opposed to a second portion of said cathode foil extending from said longitudinally central portion to a second end on the other end side,
    interposing the first separator between said first portion of said cathode foil and said first anode foil,
    arranging the second separator on said second side with respect to said cathode foil such that said second separator is opposed to said first portion of said cathode foil,
    interposing the third separator between said second portion of said cathode foil and said second anode foil,
    arranging the fourth separator on said one side with respect to said cathode foil such that said fourth separator is opposed to said second portion of said cathode foil, and
    winding, in a predetermined direction, said cathode foil, said first and second anode foils, and said first, second, third and fourth separators with said first and second portions of said cathode foil opposed to each other, said winding starting from a position corresponding to said longitudinally central portion.

7. The electrolytic capacitor according to claim 6, further comprising:
    a first anode lead connected to a predetermined position of said first anode foil,
    a second anode lead connected to a predetermined position of said second anode foil,
    a first cathode lead connected to said first portion of said cathode foil, and
    a second cathode lead connected to said second portion of said cathode foil.

8. The electrolytic capacitor according to claim 6, wherein said electrolytic capacitor includes, as an electrolyte, an electrically conductive polymer material containing at least one of polypyrrole, polythiophene and polyaniline, or a TCNQ complex salt (7,7,8,8-tetracyano-quinodimethane).

9. An electrolytic capacitor according to claim 6, wherein the capacitor element is formed by starting the winding of the cathode foil, the first and second anode foils and first, second, third and fourth separators in the predetermined direction from the position corresponding to the longitudinally central portion of the cathode foil, with a winding core being kept in direct contact with the cathode foil.

10. An electrolytic capacitor according to claim 6, wherein
an end of the first separator and an end of the fourth separator, each located in the position corresponding to the longitudinally central portion of the cathode foil, are at a distance from each other, and
an end of the second separator and an end of the third separator, each located in the position corresponding to the longitudinally central portion of the cathode foil, are at a distance from each other.

* * * * *